(12) United States Patent
Leute et al.

(10) Patent No.: US 7,963,694 B2
(45) Date of Patent: Jun. 21, 2011

(54) TEMPERATURE SENSITIVE LABEL FOR DETECTING TEMPERATURE CHANGES TO A TEMPERATURE SENSITIVE ITEM (75) Inventors: Gerardo Leute, Penfield, NY (US); Paul Kevin Acquaviva, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/552,620

(22) Filed: Sep. 2, 2009

(65) Prior Publication Data
US 2009/0320742 A1 Dec. 31, 2009

Related U.S. Application Data (62) Division of application No. 11/688,620, filed on Mar. 20, 2007, now Pat. No. 7,600,912.

(51) Int. Cl.
*G01K 1/14* (2006.01)
(52) U.S. Cl. ........................................................ 374/157
(58) Field of Classification Search .................. None
See application file for complete search history.

(56) References Cited

U.S. PATENT DOCUMENTS

| | | | |
|---|---|---|---|
| 5,323,652 A | 6/1994 | Parker | |
| 5,326,174 A | 7/1994 | Parker | |
| 5,667,303 A | 9/1997 | Arens et al. | |
| 5,709,472 A | 1/1998 | Prusik et al. | |
| 6,042,264 A | 3/2000 | Prusik et al. | |
| 6,103,351 A | 8/2000 | Ram et al. | |
| 6,214,623 B1 | 4/2001 | Simons et al. | |
| 6,244,208 B1 | 6/2001 | Qiu et al. | |
| 6,386,756 B1 | 5/2002 | Rice | |
| 6,435,128 B2 | 8/2002 | Qiu et al. | |
| 6,544,614 B1 | 4/2003 | Huffer et al. | |
| 6,634,516 B2 | 10/2003 | Carballido | |
| 6,848,390 B2 | 2/2005 | Akers et al. | |
| 6,895,191 B2 | 5/2005 | Rommelmann et al. | |
| 7,063,041 B2 | 6/2006 | Odashiro | |
| 2003/0188677 A1 | 10/2003 | Akers et al. | |
| 2006/0204271 A1* | 9/2006 | Tai et al. | 399/92 |
| 2007/0053406 A1 | 3/2007 | LaGuardia et al. | |
| 2007/0121702 A1 | 5/2007 | LaGuardia et al. | |
| 2008/0056329 A1 | 3/2008 | Smith et al. | |
| 2008/0142529 A1 | 6/2008 | LaGuardia et al. | |
| 2008/0144699 A1 | 6/2008 | Plevich et al. | |
| 2008/0215037 A1 | 9/2008 | Petrakis | |

FOREIGN PATENT DOCUMENTS

JP 2003076278 3/2003
WO 9628714 9/1996

* cited by examiner

*Primary Examiner* — Andre J Allen
(74) *Attorney, Agent, or Firm* — MH2 Technology Law Group LLP (57) ABSTRACT

A temperature sensitive label may be affixed to a temperature sensitive item. The temperature sensitive label conveys when the item has reached a tripping temperature. The tripping temperature may be a temperature at which the item is compromised. To convey this, the label changes properties and functions with a message to convey that the item has been exposed to the tripping temperature. For example, the label may reveal, block, or alter a message that conveys whether the item has been exposed to the tripping temperature. The message may be part of the label or separate from the label.

8 Claims, 8 Drawing Sheets

TEMPERATURE SENSITIVE LABEL FOR DETECTING TEMPERATURE CHANGES TO A TEMPERATURE SENSITIVE ITEM

CROSS REFERENCE TO RELATED APPLICATION

This application is a divisional application of U.S. patent application Ser. No. 11/688,620 filed on Mar. 20, 2007, the disclosure of which is incorporated herein by reference.

FIELD

This invention relates generally to labels.

BACKGROUND

Currently, many different types of products are susceptible to temperature changes. The temperature changes may either damage, compromise, or destroy the products. For example, food products may become spoiled or dangerous if subjected to temperatures above a certain level. Typically, these products may be subjected to temperature changes after manufacture such as during transport or storage. As such, a manufacturer may have no method for checking the product to determine if the product has been compromised. Further, a consumer using the product has no method for determining if the product has been comprised except for trying or using the product. However, blindly using the product may be dangerous to the consumer or could damage equipment used by the consumer.

For example, printer and copier products, such as toner/replenisher materials, are sensitive to high temperature extremes. Toner, in particular, can block or fuse together when subjected to these high temperatures. In such a case, the fused or blocked toner may cause machine operation problems. However, the compromised toner is not readily apparent until a problem with print quality occurs.

Accordingly, it is desirable to determine whether a product has been subjected to a compromising temperature without having to try the product.

SUMMARY

An embodiment of the present disclosure is directed to a label for identifying temperature change of an item. The label comprises a message identifying whether the item has been exposed to a temperature that may affect the item and a material capable of changing properties when exposed to the temperature. The material is positioned to function with the message to identify when the item has been exposed to the temperature.

Another embodiment of the present disclosure is directed to a label for identifying temperature change of an item. The label comprises a material capable of changing properties when exposed to a temperature. The material is positioned to function with a message to identify when the item has been exposed to the temperature.

Another embodiment of the present disclosure is directed to a toner container. The toner container comprises a housing for storing toner and a label for identifying temperature change of the toner container. The label comprises a material capable of changing properties when exposed to a temperature. The material is positioned to function with a message to identify when the item has been exposed to the temperature.

Additional embodiments of the present disclosure will be set forth in part in the description which follows, and in part will be obvious from the description, or may be learned by practice of the embodiments. The embodiments will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the invention.

DETAILED DESCRIPTION

Embodiments of the present disclosure are directed to a temperature sensitive label which may be affixed to a temperature sensitive item. The temperature sensitive label conveys when the item has reached a predetermined or "tripping" temperature. The tripping temperature may be a temperature or a predetermined temperature range at which the item may become compromised. To convey this, the label changes properties and functions with a message to convey that the item has been exposed to the tripping temperature. For example, the label may reveal, block, or alter a message that conveys whether the item has been exposed to the tripping temperature. The message may be part of the label or separate from the label.

Reference will now be made in detail to the exemplary embodiments of the present disclosure, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments. These embodiments are described in sufficient detail to enable those skilled in the art to practice the invention and it is to be understood that other embodiments may be utilized and that changes may be made without departing from the scope of the invention. The following description is, therefore, merely exemplary.

Figure 1:
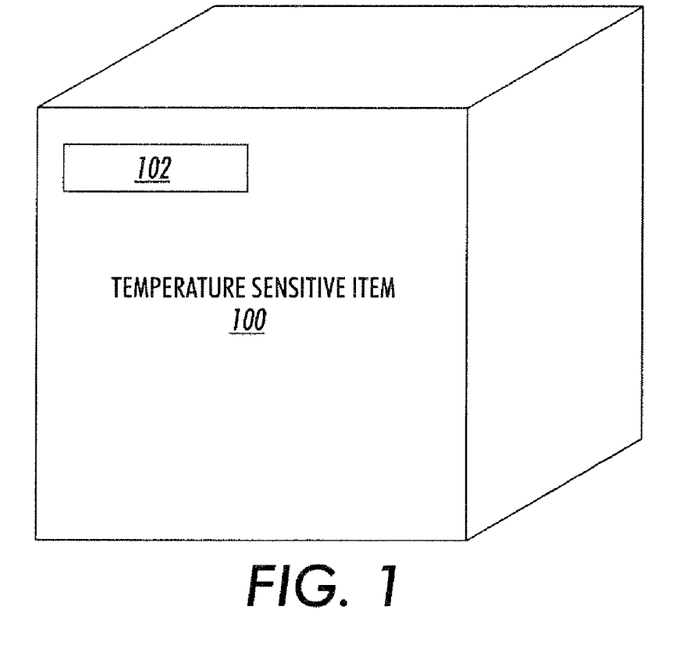
FIG. 1 is a diagram illustrating a temperature sensitive item including a temperature sensitive label consistent with embodiments of the present disclosure.

FIG. 1 is a diagram illustrating a temperature sensitive item 100 including a temperature sensitive label 102 consistent with embodiments of the present disclosure. Temperature sensitive label 102 changes in response to item 100 or in response to the environment in which item 100 resides reaching a tripping temperature. The tripping temperature may be a temperature at which item 100 may be become dangerous, damaged, unsafe, useless, and the like. The temperature may be the temperature of item 100, the temperature of the environment in which item 100 is located, and the like. As such, label 102 may be utilized to determine if item 100 has been subjected to tripping temperatures that may compromise item 100.

Temperature sensitive item 100 may be any type of item that may be susceptible to varying temperatures. Item 100 may be food, drugs, beverages, electronic equipment, chemicals, printer ink, printer toner, copier ink, copier toner, replenisher, and the like. For example, item 100 may be food that becomes spoiled or dangerous after being exposed to certain temperatures.

Temperature sensitive label 102 comprises a temperatures sensitive material that changes properties in response to item 100 or the environment in which item 100 resides reaching a tripping temperature. When the temperature sensitive material changes properties, label 102 conveys a message or messages that indicate item 100 may have been exposed to a tripping temperature. Temperature sensitive material may change in any manner suitable for conveying a message or messages that indicate item 100 has been subjected to a tripping temperature. For example, label 102 may change color, change transparency, and the like.

Once label 102 is exposed to the tripping temperature, label 102 may continue to display the message or messages even when no longer exposed to the tripping temperature. Likewise, once label 102 is exposed to the tripping temperature, label 102 may discontinue displaying the message or messages when no longer exposed to the tripping temperature.

The temperature sensitive material may be any type of temperature sensitive material that changes properties in response to a tripping temperature, such as chemical indicators, thermochromatic ink, leucodyes, fusible materials, and the like. For example, temperature sensitive materials may include temperature sensitive chemical indicators or thermochromatic ink used to communicate letters, symbols, words, barcodes, or other indicia. Thermochromic or thermochromatic inks may comprise leucodye and a developer dissolved in a medium. Upon heating, the medium melts and dissolves the dye and developer, resulting in a change in color. Upon cooling, the medium crystallizes and the color reverts back to the original. The thermochromatic inks may be any type of well-known inks such as SunChemical's ThermaSOLV. Additionally, for example, the temperature sensitive materials may include fusible materials. When exposed to tripping temperatures, the fusible material fuses and becomes transparent or opaque.

The temperature at which the material changes properties may be dependant upon the type of material utilized. Temperature sensitive material may changes properties in response to a particular temperature or range of temperatures.

The messages or messages conveyed by label 102 may be any type of indicia to indicate that item 100 has or has not been exposed to the tripping temperature. The message or messages may be detectable by humans, machines, or both. For example, the message may be a text message, such as "Too Hot," or barcode representing the same, which indicates item 100 may have been exposed to a tripping temperature.

Temperature sensitive label 102 may be constructed such that the temperature sensitive material and the message or messages are a part of label 102. The material and message may be arranged in any configuration to convey the message in response to the tripping temperature. The message may be constructed of the temperature sensitive material or the message be may be covered with the temperature sensitive material. Then, when label 102 is exposed to the tripping temperature, the material changes properties and affects the message. The temperature sensitive material may change properties to reveal, alter, or obscure the message or messages.

For example, label 102 may be constructed of a label material consisting of a support surface, an adhesive layer, and temperature sensitive chemical indicators or thermochromatic ink used to communicate letters, symbols, words, barcodes, or other characters. The label may consist of a colored paper layer applied to a label stock. Adhesive is applied to the label stock. The colored paper layer may be coated with a fusible material. The fusible material may be coated a clear film, such as Mylar or some similar material. Alternatively, the fusible material may be encapsulated by the Mylar. Under normal conditions, the fusible material may be opaque. Upon reaching the tripping temperature, the fusible material fuses and becomes transparent, thus revealing the underlying paper layer. The underlying paper layer may include a contrasting color to the surrounding label stock, thus presenting a clear indication that the label has reached the tripping temperature. The underlying paper layer may also include a message indicating that the label has reached a tripping temperature. Similarly, the fusible material may initially be transparent, and may become opaque after exposure to the tripping temperature.

Temperature sensitive label 102 may also be constructed of the temperature sensitive material and, optionally, a message or messages in order to function with a message that is part of item 100. As such, label 102 may be affixed to item 100 and may affect the message that is part of item 100. The material and optional message or messages may be arranged in any configuration to function with the message on item 100. Label 102 may include a temperature sensitive material and may be positioned to cover a message on item 100. When label 102 is exposed to the temperature, the material changes properties and affects the message on item 100. The temperature sensitive material may change to reveal, alter, or obscure the message on item 100.

For example, label 102 may consist of a layer of fusible material. The fusible material may be coated a clear film, such as Mylar or some similar material. Alternatively, the fusible material may be encapsulated by the Mylar. Adhesive may be applied to one side of the layer of fusible material. Label 102 may then be positioned to function with a message that is part of item 100. In the nominal state the fusible material may be opaque. Upon reaching the tripping temperature, the fusible material fuses and becomes transparent, thus revealing or altering the message that is part of item 100. Similarly, the fusible material may initially be transparent, and may become opaque after exposure to the tripping temperature.

Temperature sensitive label 102 may be affixed to item 100 at any location to detect changes in temperature to item 100 or to the environment in which item 100 resides. For example, label 102 may be directly affixed to item 100. Additionally, label 102 may be affixed to packaging covering item 100.

As mentioned above, the change in temperature sensitive label 102 may be readable either by a machine, human, or both. FIGS. 2-5 are diagrams illustrating examples of temperature sensitive label 102 that may be read by either a machine or human consistent with embodiments of the present disclosure. Labels 102 illustrated in FIGS. 2-5 indicate that item 100 has reached a tripping temperature by either displaying a message or altering a message contained in label 102 or on item 100. The tripping temperature may be a temperature at which item 100 may become damaged, useless, unsafe, dangerous, or the like.

Figure 2:
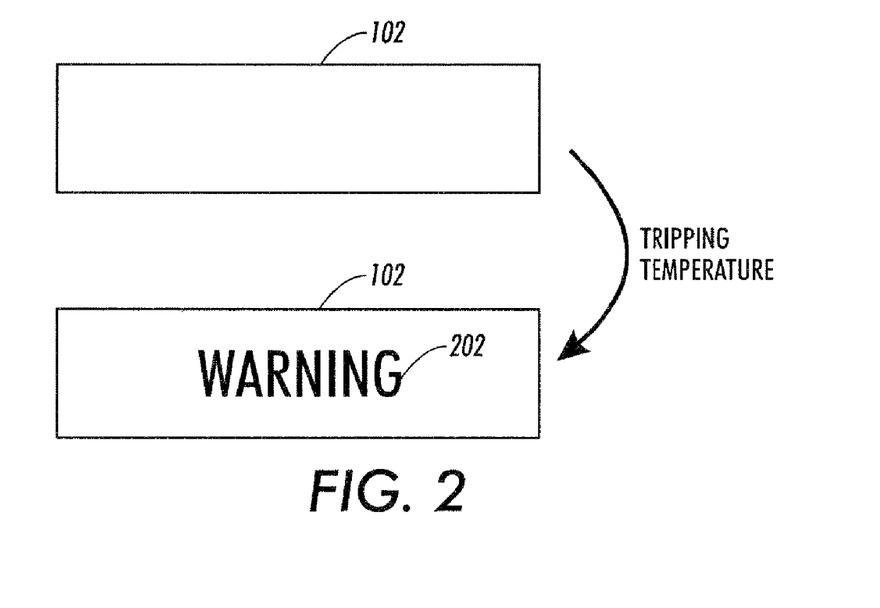
FIGS. 2-5 are diagrams illustrating exemplary temperature sensitive labels which include messages readable by humans or machines consistent with embodiments of the present disclosure.

FIG. 2 is a diagram illustrating an example of label 102 that displays a message in response to being exposed to a tripping temperature. As illustrated in FIG. 2, label 102 comprises a message covered with an opaque temperature sensitive material that reveals the message when being exposed to the tripping temperature.

The warning message may be a part of label 102. For example, label 102 may consist of a first layer containing the warning message and a second layer of temperature sensitive material positioned over and covering the first layer. Additionally, the warning message may be a part of item 100. For example the warning message may be printed on item 100 and label 102 may be affixed to cover the warning message. One skilled in the art will realize that label 102 may be constructed of any number of layers necessary to convey the warning message.

The temperature sensitive material may become transparent when a tripping temperature has been reached. Under normal conditions, label 102 would appear blank due to the presence of the untripped temperature sensitive material covering the message. Upon reaching the tripping temperature, the material in the temperature sensitive label becomes transparent, revealing a message 202 beneath.

For example, as illustrated, message 202 may consist of a text message such as "Warning." While FIG. 2 illustrates a text message, one skilled in the art will realize that message 202 may be any type of graphical message, text message, indicia or combination thereof to indicate that temperature sensitive item 100 has been subjected to a temperature, which may compromise item 100.

Message 202 may be detected and read by a human or a machine. For example, a human may detect and read message 202 by inspecting item 100 to determine if message 202 has become visible. A machine may detect message 202 using a text or graphics detector such as an optical image scanner to determine if message 202 has become visible.

In the exemplary label 102 described in FIG. 2, the warning message may be covered with an opaque temperature sensitive material. One skilled in the art will realize that the warning message may be constructed of the temperature sensitive material. As such, the warning message may change properties and become visible when exposed to the tripping temperature.

Figure 3:
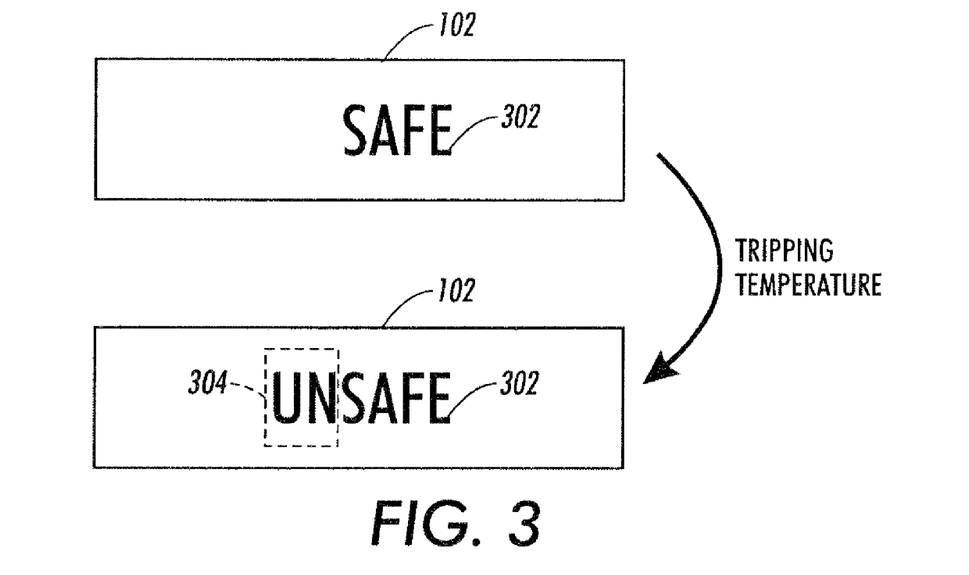

FIG. 3 is a diagram illustrating another example of label 102 that changes messages in response to being exposed to a tripping temperature. As illustrated in FIG. 3, label 102 comprises a first message that conveys item 100 has not been exposed to the tripping temperature. Label 102 also comprises a second message covered with a temperature sensitive material. The second message is revealed and alters the first message when exposed to the tripping temperature.

For example, label 102 comprises a message 302 positioned on a first layer. Message 302 conveys that item 100 has not been exposed to the tripping temperature, which may compromise item 100. To indicate exposure to the tripping temperature, another message 304, which alters message 302, may be positioned on the first layer. Message 304 may be covered with an opaque temperature sensitive material. The temperature sensitive material may become transparent when the tripping temperature has been reached. One skilled in the art will realize that label 102 may be constructed of any number of layers necessary to convey the message.

Under normal conditions, label 102 would display message 302 that conveys item 100 has not been exposed to the tripping temperature. Upon reaching the tripping temperature, the temperature sensitive material in the label 102 becomes transparent, revealing a message 304 beneath. Message 304 would alter message 302 in order to indicate that item 100 has been exposed to the tripping temperature.

For example, as illustrated, message 302 may consist of a text message, such as "Safe," indicating that item 100 has not been exposed to the tripping temperature. Then, once exposed to the tripping temperature, message 304, which may consist of a text message "Un," may become visible. The combination of message 302 and message 304 consists of the text message "UnSafe" that indicates item 100 may have been compromised. While FIG. 3 illustrates a text message, one skilled in the art will realize that message 302 and message 304 may be any type of graphical message, text messages, indicia, or combination thereof, to indicate that temperature sensitive item 100 has been subjected to a temperature, which may compromise item 100.

Message 302 and message 304 may be detected and read by a human or a machine. For example, a human may detect and read message 302 and message 304 by inspecting item 100 to determine if message 304 has become visible. A machine may detect message 302 and message 304 using a text or graphics detector such as an optical image scanner to determine if message 304 has become visible.

In the example of label 102 described above in reference to FIG. 3, messages 302 and 304 may be contained in label 102. Additionally, message 302, message 304, or both may be part of item 100. For example, message 302 may be printed or may be preexistent on item 100. Then, label 102, which includes message 304 covered with an opaque temperature sensitive material, may be positioned adjacent message 302 in order to alter message 302. When the tripping temperature is reached, opaque temperature sensitive material may become transparent to reveal message 304 and alter message 302.

In the exemplary label 102 described in FIG. 3, the message may be covered with an opaque temperature sensitive material. One skilled in the art will realize that the message may be constructed of the temperature sensitive material. As such, the message may change properties and become visible when exposed to the tripping temperature.

Figure 4:
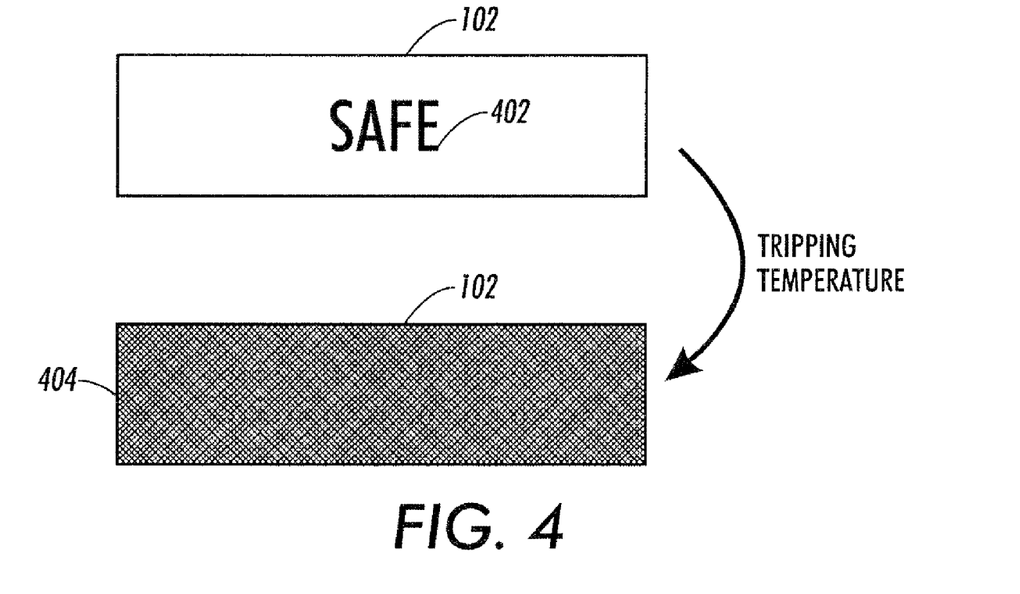

FIG. 4 is a diagram illustrating another example of label 102 in which a message is obscured in response to being exposed to a tripping temperature. As illustrated in FIG. 4, label 102 comprises a message covered with a transparent temperature sensitive material. The message may convey that item 100 has not been exposed to the tripping temperature. The material obscures the message when exposed to the tripping temperature.

For example, label 102 may comprise a message 402 positioned on a first layer. Message 402 conveys that item 100 has not been exposed to the tripping temperature which may compromise item 100. To indicate exposure to the tripping temperature, message 402 may be covered with second layer comprising a transparent temperature sensitive material. The transparent temperature sensitive material may become opaque or may darken when the tripping temperature has been reached. One skilled in the art will realize that label 102 may be constructed of any number of layers necessary to convey the message.

Under normal conditions, label 102 would display message 402 that conveys item 100 has not been exposed to the tripping temperature. Upon reaching the tripping temperature, transparent temperature sensitive material becomes opaque or darkens obscuring message 402 and leaving a blank or black message 404.

For example, as illustrated, message 402 may consist of a text message, such as "Safe," indicating that item 100 has not been exposed to the tripping temperature. Then, once exposed to the tripping temperature, message 402 may be obscured by blank or black message 404. The absence of message 402, consisting of the text message "Safe," may indicate that item 100 has been compromised. While FIG. 4 illustrates a text message, one skilled in the art will realize that message 402 may be any type of graphical or text messages, or other indicia to indicate that temperature sensitive item 100 has been subjected to a temperature, which may compromise item 100.

Message 402 may be detected and read by a human or a machine. For example, a human may detect and read message 402 by inspecting item 100 to determine if message 402 is visible. A machine may detect message 402 and message 404 using a text or graphics detector such as an optical image scanner to determine if message 402 is visible.

In the example of label 102 described above with reference to FIG. 4, message 402 may be part of label 102. Additionally, message 402 may be part of item 100. For example, message 402 may be printed or may be preexistent on item 100. Then, label 102, which comprises a transparent temperature sensitive material, may be positioned over message 402. When the tripping temperature is reached, transparent temperature sensitive material may become opaque or may darken, thereby obscuring message 402.

In the exemplary label 102 described in FIG. 4, the message may be covered with a transparent temperature sensitive material. One skilled in the art will realize that the message may be constructed of the temperature sensitive material. As such, the message may change properties and become invisible when exposed to the tripping temperature.

Figure 5:
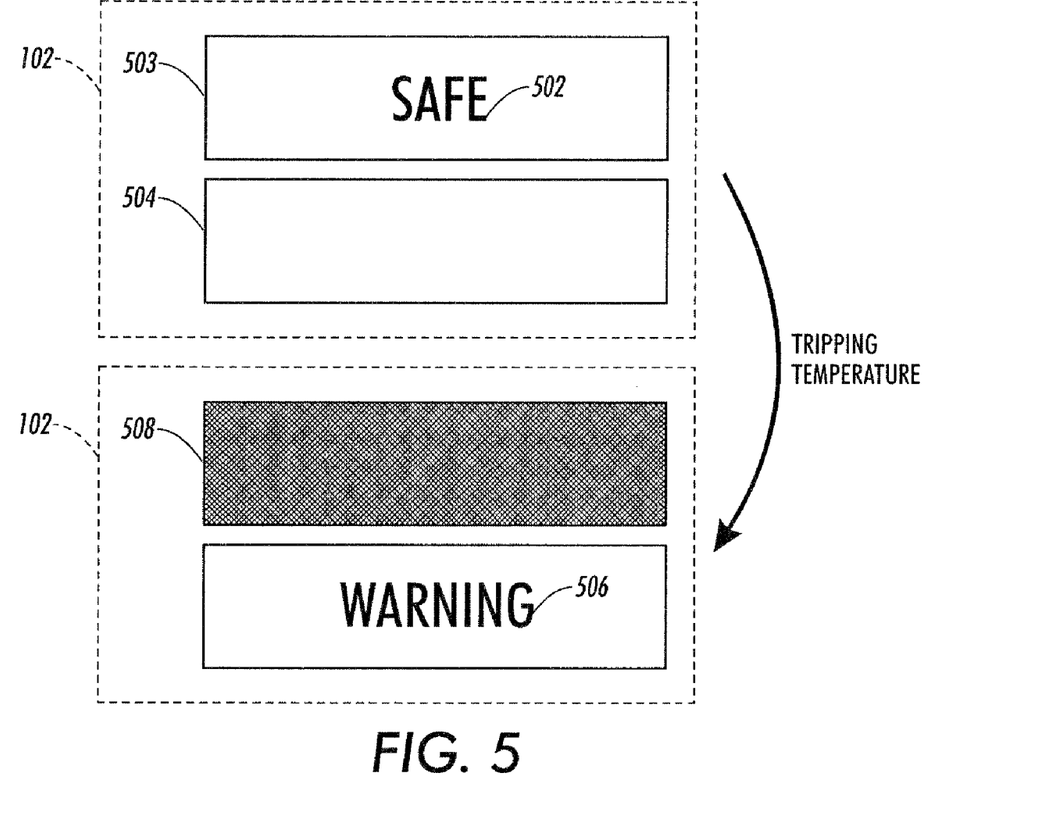

FIG. 5 is a diagram illustrating another example of label 102 in which a message is obscured and a message is displayed in response to being exposed to a tripping temperature. As illustrated in FIG. 5, label 102 comprises a first message covered with a transparent temperature sensitive material and a second message covered with an opaque temperature sensitive material. The first message may convey that item 100 has not been exposed to the tripping temperature and the second message may convey that item 100 has been exposed to the tripping temperature. The first message may be obscured and the second message may be revealed when exposed to the tripping temperature.

For example, label 102 comprises a message 502 on a first portion 503 of a first layer. Message 502 may convey that item 100 has not been exposed to tripping temperatures, which may compromise item 100. Message 502 may be covered with a second layer which comprises a transparent temperature sensitive material covering first portion 503. The transparent temperature sensitive material may become opaque or may darken when a tripping temperature has been reached.

In addition, to indicate exposure to the tripping temperatures, label 102 may also include a warning message 506 on a second portion 504 of the first layer. The second layer covering second portion 504 may comprise an opaque temperature sensitive material. Upon reaching the tripping temperature, the material in the temperature sensitive label becomes transparent, revealing message 506 beneath. One skilled in the art will realize that label 102 may be constructed of any number of layers necessary to convey the message.

Under normal conditions, label 102 would display message 502 that conveys item 100 has not been exposed to tripping temperatures. Upon reaching the tripping temperature, transparent temperature sensitive material, covering first portion 503, becomes opaque or darkens obscuring message 502 with opaque or black message 508. At the same time, upon reaching the tripping temperature, temperature sensitive material, covering second portion 504, becomes transparent, revealing message 506 beneath.

For example, as illustrated, message 502 may consist of a text message, such as "Safe," indicating that item 100 has not been exposed to the tripping temperature. Then, once exposed to the tripping temperature, message 502 may be obscured. At the same time, upon reaching the tripping temperature, temperature sensitive material, covering second portion 504, becomes transparent revealing a message 506 that may consist of a text message such as "Warning." While FIG. 5 illustrates a text message, one skilled in the art will realize that message 502 and message 506 may be any type of graphical or text messages to indicate that temperature sensitive item 100 has been subjected to a temperature which may compromise item 100.

Message 502 and message 506 may be detected and read by a human or a machine. For example, a human may detect and read message 502 and message 506 by inspecting item 100 to determine if message 502 is visible or if message 506 is visible. A machine may detect message 502 and message 506 using a text or graphics detector such as an optical image scanner to determine if message 502 is visible or message 506 is visible.

In the example of label 102 described above with reference to FIG. 5, message 502 and message 506 may be part of label 102. Additionally, message 502, message 506, or both may be part of item 100. For example, message 502 may be printed or may be preexistent on item 100. Then, label 102 may comprise a transparent temperature sensitive material in first portion 503. Label 102 may also comprise second portion 504, which includes message 506 covered with an opaque temperature sensitive material. Label 102 may be positioned such that first portion 503 covers message 502. When the tripping temperature is reached, transparent temperature sensitive material of first portion 503 may become opaque or may darken, thereby obscuring message 502. At the same time, the opaque temperature sensitive material of second portion 504 may become transparent revealing message 506.

In the exemplary label 102 described in FIG. 5, the messages may be covered with a transparent temperature sensitive material or an opaque temperature sensitive material. One skilled in the art will realize that the messages may be constructed of the temperature sensitive material. As such, the messages may change properties and become visible or invisible when exposed to the tripping temperature.

As mentioned above, the change in temperature sensitive label 102 may be configured to be read by a machine. FIGS. 6-9 are diagrams illustrating examples of temperature sensitive label 102 that may be read by a machine consistent with embodiments of the present disclosure. Labels 102 illustrated in FIG. 6-9 indicate that item 100 has reached a tripping temperature by either displaying a machine-readable message or altering a machine-readable message contained in label 102. The tripping temperature may be the temperature at which item 100 may become damaged, useless, unsafe, dangerous, and the like.

Figure 6:
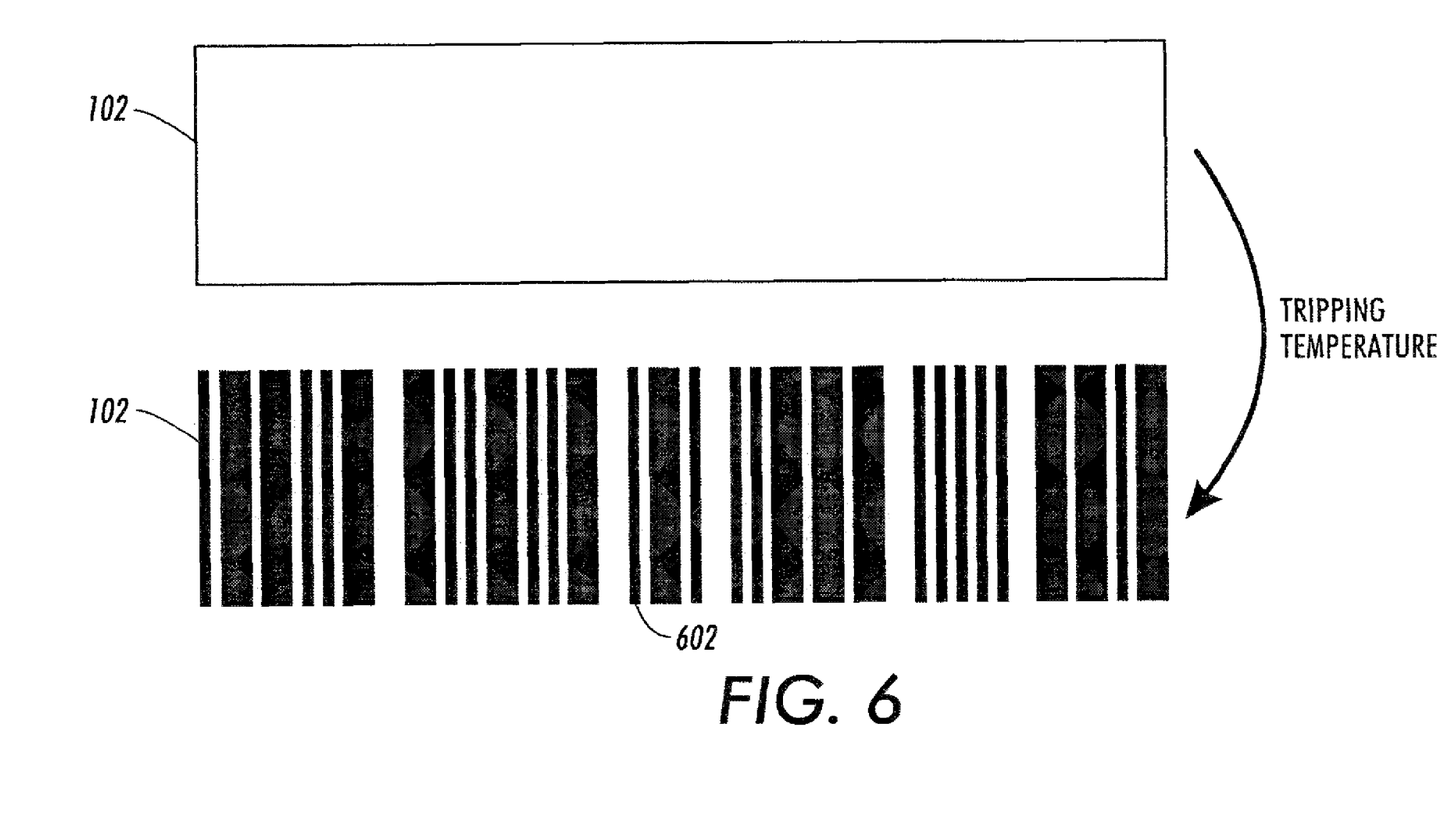
FIGS. 6-9 are diagrams illustrating exemplary temperature sensitive labels which include messages readable by machines consistent with embodiments of the present disclosure.

FIG. 6 is a diagram illustrating an example of label 102 that displays a machine-readable message in response to being exposed to a tripping temperature. As illustrated in FIG. 6, label 102 comprises a machine readable message covered with an opaque temperature sensitive material. The machine-readable message is revealed when exposed to the tripping temperature.

The machine-readable message may be a part of label 102. For example, label 102 may consist of a first layer containing the machine-readable message and a second layer of temperature sensitive material positioned over and covering the first layer. Additionally, the machine-readable message may be a part of item 100. For example, the machine-readable message may be printed on item 100 and label 102 may be affixed to cover the machine-readable message. One skilled in the art will realize that label 102 may be constructed of any number of layers necessary to convey the machine-readable message.

The temperature sensitive material may become transparent when a tripping temperature has been reached. Under normal conditions, label 102 would appear blank due to the presence of the untripped temperature sensitive material. Upon reaching the trigger temperature, the material in the temperature label becomes transparent, revealing a machine-readable message 602 beneath.

For example, as illustrated, machine-readable message 602 may consist of a barcode that corresponds to a message such as "tripping temperature reached." While FIG. 6 illustrates a barcode, one skilled in the art will realize that message 602 may be any type of machine-readable message to indicate that temperature sensitive item 100 has been subjected to a temperature which may compromise item 100, such as glyphs.

Machine-readable message 602 may be detected and read by any type of device capable of reading the machine-readable message. For example, a barcode reader may scan label 102 to determine if machine-readable message 602 has become visible.

In the exemplary label 102 described in FIG. 6, the machine-readable message may be covered with an opaque temperature sensitive material. One skilled in the art will realize that the machine-readable message may be constructed of the temperature sensitive material. As such, the machine-readable message may change properties and become visible when exposed to the tripping temperature.

Figure 7:
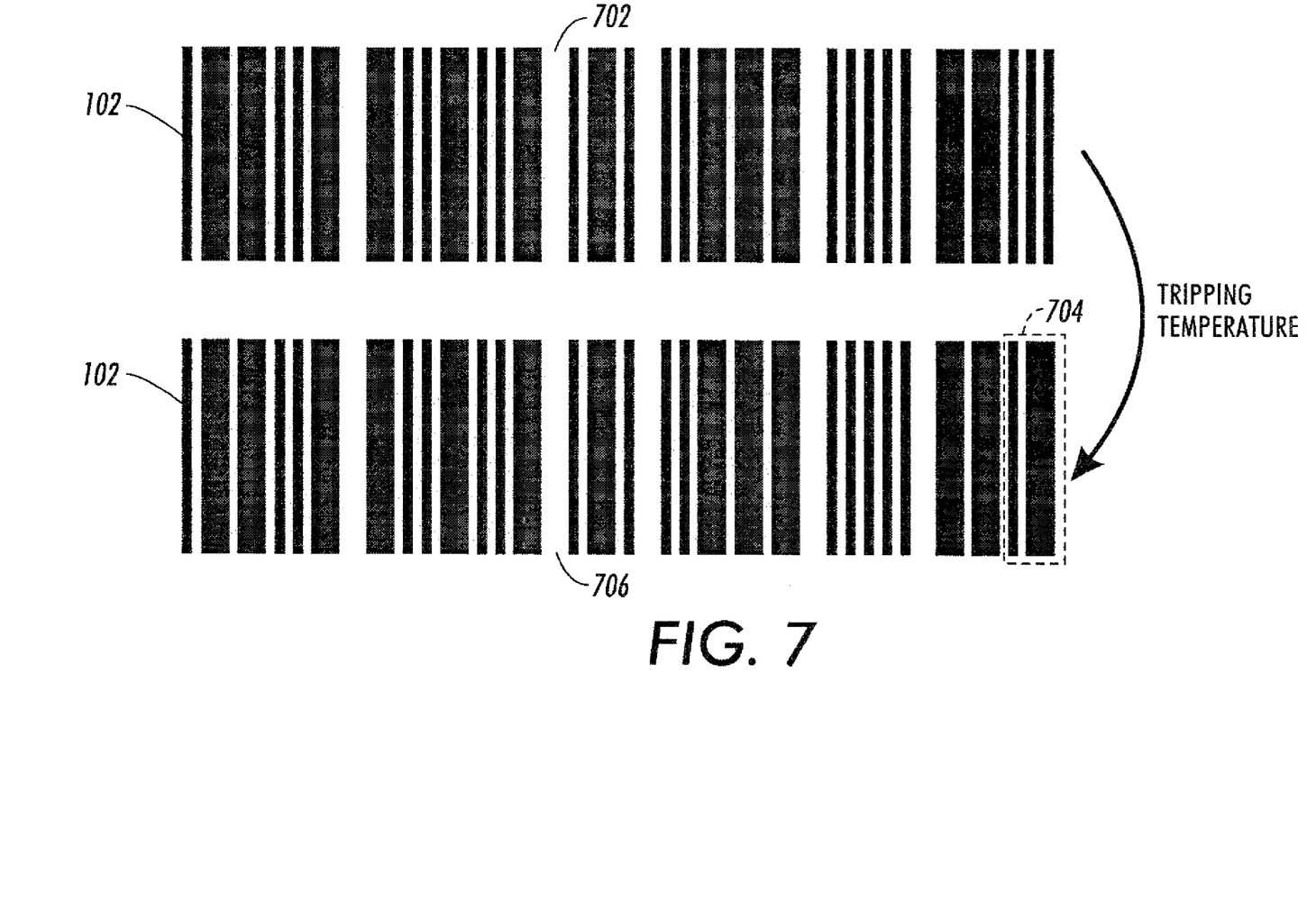

FIG. 7 is a diagram illustrating another example of label 102 that changes machine-readable messages in response to being exposed to a tripping temperature. As illustrated in FIG. 7, label 102 comprises a first machine-readable message that conveys item 100 has not been exposed to the tripping temperature. Label 102 also comprises a second machine-readable message covered with a temperature sensitive material. The second machine-readable message is revealed and alters the first machine-readable message when exposed to the tripping temperature.

For example, label 102 may comprise a machine-readable message 702 positioned on a first layer. Machine-readable message 702 conveys that item 100 has not been exposed to the tripping temperature, which may compromise item 100. To indicate exposure to the tripping temperature, another machine-readable message 704, which alters message 702, may be positioned on the first layer. Machine-readable message 704 may be covered with an opaque temperature sensitive material. The temperature sensitive material may become transparent when the tripping temperature has been reached. One skilled in the art will realize that label 102 may be constructed of any number of layers necessary to convey the machine-readable message.

Under normal conditions, label 102 would display machine-readable message 702 that conveys item 100 has not been exposed to tripping temperatures. Upon reaching the tripping temperature, the material in the temperature label becomes transparent, revealing a machine-readable message 704 beneath. Machine-readable message 704 would alter machine-readable message 702 to create a new machine-readable message 706. Machine-readable message 706 may indicate that item 100 has been exposed to the tripping temperature.

For example, as illustrated, machine-readable message 702 may consist of a barcode representing a text message such as "Item XYZ." The barcode indicates that item 100 has not been exposed to the tripping temperature. Then, once exposed to the tripping temperature, machine-readable message 704 would change machine-readable message 702 into machine-readable message 706. Machine-readable message may consist of a new barcode representing a text message such as "Item XYZ unsafe". The combination of machine-readable message 702 and machine-readable message 704 may indicate item 100 being compromised. While FIG. 7 illustrates a barcode, one skilled in the art will realize that machine-readable message 702, machine-readable message 704, and machine-readable message 706 may be any type of machine-readable messages to indicate that temperature sensitive item 100 has been subjected to a temperature which may compromise item 100, such as glyphs.

Machine-readable message 702, machine-readable message 704, and machine-readable message 706 may be detected and read by any type of device capable of reading the machine-readable messages. For example, a barcode reader may scan label 102 to determine if machine-readable message 702 has been changed to machine-readable message 706.

In the example of label 102 described above in reference to FIG. 7, machine-readable messages 702 and 704 may be contained in label 102. Additionally, message 702, message 704, or both may be part of item 100. For example, machine-readable message 702 may be printed or may be preexistent on item 100. Then, label 102, which includes machine-readable message 704 covered with an opaque temperature sensitive material, may be positioned adjacent machine-readable message 702 in order to change machine-readable message 702 into machine-readable message 706. When the tripping temperature is reached, opaque temperature sensitive material may become transparent to reveal machine-readable message 704 and alter machine-readable message 702.

In the exemplary label 102 described in FIG. 7, the machine-readable message may be covered with an opaque temperature sensitive material. One skilled in the art will realize that the machine-readable message may be constructed of the temperature sensitive material. As such, the machine-readable message may change properties and become visible when exposed to the tripping temperature.

Figure 8:
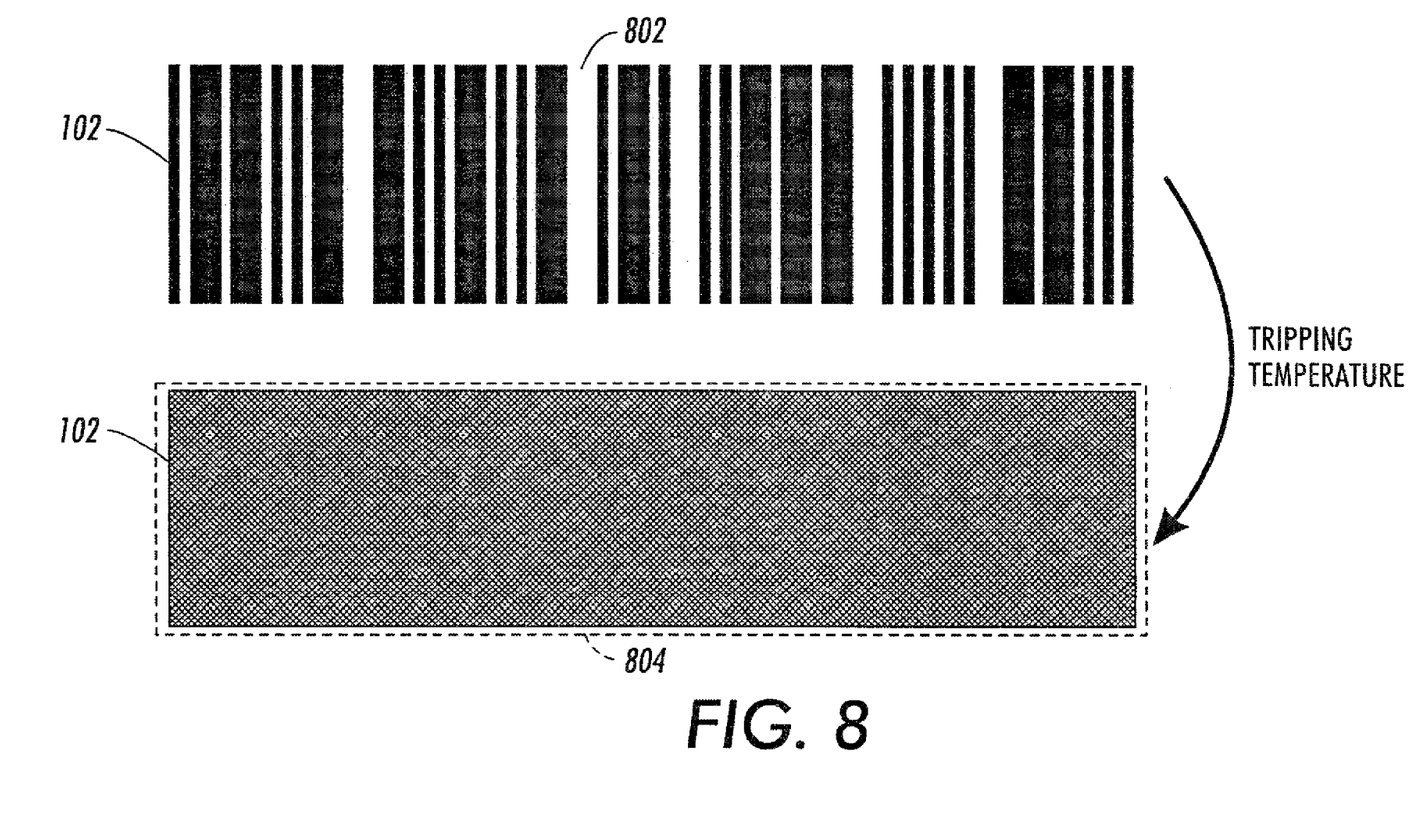

FIG. 8 is a diagram illustrating another example of label 102 in which a machine-readable message is obscured in response to being exposed to a tripping temperature. As illustrated in FIG. 8, label 102 comprises a machine-readable message covered with a transparent temperature sensitive material. The machine-readable message conveys that item 100 has not been exposed to the tripping temperature. The material obscures the message when exposed to the tripping temperature.

For example, label 102 comprises a machine-readable message 802 positioned on a first layer. Machine-readable message 802 conveys that item 100 has not been exposed to the tripping temperature, which may compromise item 100. To indicate exposure to the tripping temperature, machine-readable message 802 may be covered with second layer comprising a transparent temperature sensitive material. The transparent temperature sensitive material may become opaque or may darken when the tripping temperature has been reached. One skilled in the art will realize that label 102 may be constructed of any number of layers necessary to convey the machine-readable message.

Under normal conditions, label 102 would display machine-readable message 802 that conveys item 100 has not been exposed to tripping temperatures. Upon reaching the tripping temperature, transparent temperature sensitive material becomes opaque or darkens obscuring machine-readable message 802, leaving a blank or black message 804.

For example, as illustrated, machine-readable message 802 may consist of a barcode representing a text message, such as "Item XYZ." The barcode indicates that item 100 has not been exposed to the tripping temperature. Then, once exposed to the tripping temperature, machine-readable message 802 may be obscured by the blank or black message 804. The absence of machine-readable message 802 may indicate damage or problems with item 100. While FIG. 8 illustrates a barcode, one skilled in the art will realize that machine-readable message 802 may be any type of machine-readable messages to indicate that temperature sensitive item 100 has been subjected to a temperature which may compromise item 100, such as glyphs.

Machine-readable message 802 may be detected and read by any type of device capable of reading the machine-readable message. For example, a barcode reader may scan label 102 to determine if machine-readable message 802 is visible.

In the example of label 102 described above with reference to FIG. 8, message 802 may be part of label 102. Additionally, message 802 may be part of item 100. For example, message 802 may be printed or may be preexistent on item 100. Then, label 102, which comprises a transparent temperature sensitive material, may be positioned over message 802. When the tripping temperature is reached, transparent temperature sensitive material may become opaque or may darken, thereby obscuring message 802.

In the exemplary label 102 described in FIG. 8, the machine-readable message may be covered with a transparent temperature sensitive material. One skilled in the art will realize that the machine-readable message may be constructed of the temperature sensitive material. As such, the machine-readable message may change properties and become invisible when exposed to the tripping temperature.

Figure 9:
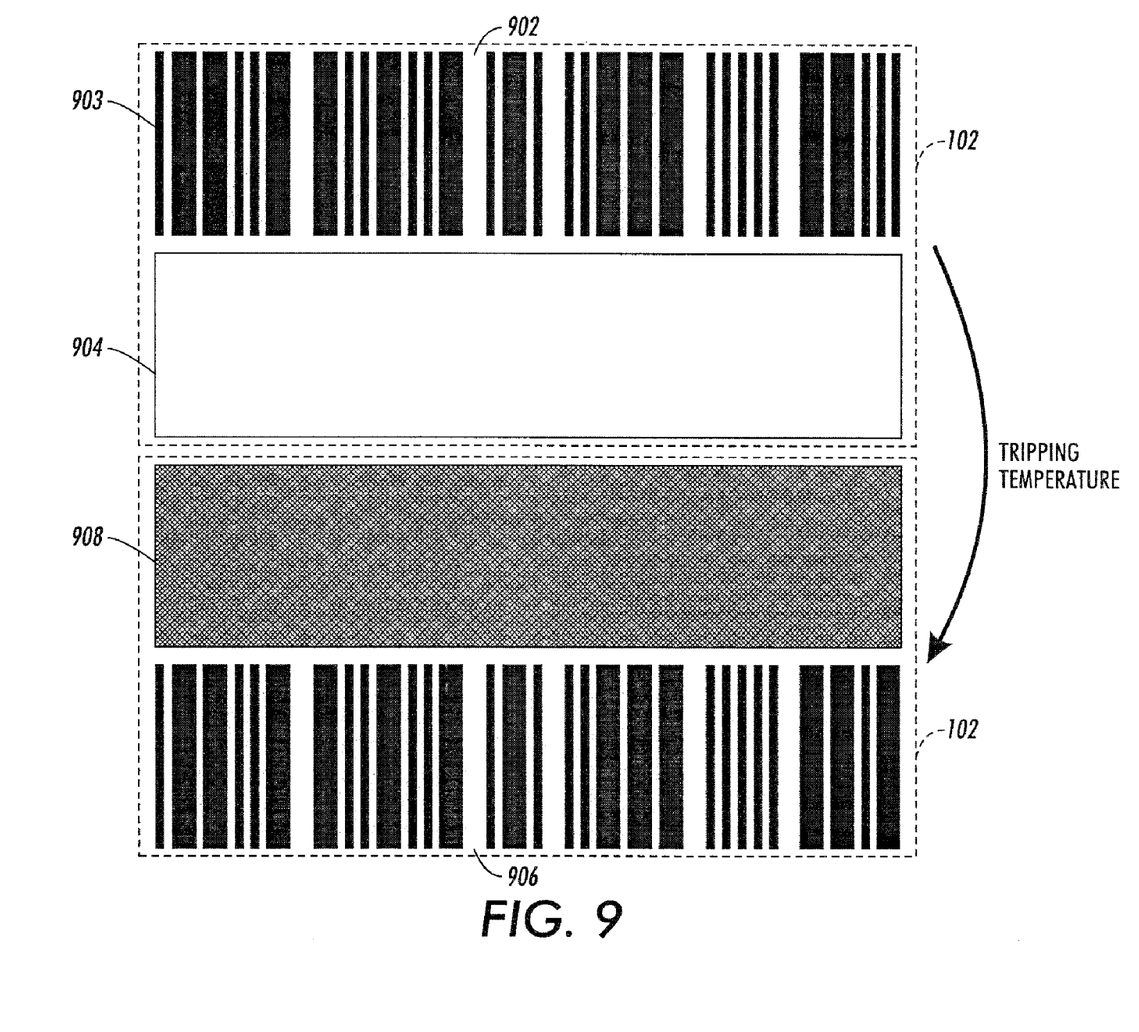

FIG. 9 is a diagram illustrating another example of label 102 in which a machine-readable message is obscured and a machine-readable message is displayed in response to being exposed to a tripping temperature. As illustrated in FIG. 9, label 102 comprises a first machine-readable message covered with a transparent temperature sensitive material and a second machine-readable message covered with an opaque temperature sensitive material. The first machine-readable message may convey that item 100 has not been exposed to the tripping temperature and the second machine-readable message may convey that item 100 has been exposed to the tripping temperature. The first machine-readable message may be obscured and the second machine-readable message may be revealed when exposed to the tripping temperature.

For example, label 102 comprises a machine-readable message 902 on a first portion 903 of a first layer. Machine-readable message 902 may convey that item 100 has not been exposed to tripping temperatures, which may compromise item 100. Machine-readable message 902 may be covered with a second layer, which comprises a transparent temperature sensitive material covering first portion 903. The transparent temperature sensitive material may become opaque or may darken when a tripping temperature has been reached.

In addition, to indicate exposure to the tripping temperatures, label 102 may also include a machine-readable message 906 on a second portion 904 of the first layer. The second layer covering second portion 904 may comprise an opaque temperature sensitive material. Upon reaching the tripping temperature, the material in the temperature sensitive label becomes transparent, revealing machine-readable message 906 beneath. One skilled in the art will realize that label 102 may be constructed of any number of layers necessary to convey the machine-readable message.

Under normal conditions, label 102 would display machine-readable message 902 that conveys item 100 has not been exposed to tripping temperatures. Upon reaching the tripping temperature, transparent temperature sensitive material becomes opaque or darkens obscuring machine-readable message 902 with opaque or black message 906. At the same time, upon reaching the tripping temperature, temperature sensitive material of second portion 904 becomes transparent, revealing a machine-readable message 902 beneath.

For example, as illustrated, machine-readable message 902 may consist of a barcode representing a text message such as "Item XYZ." The barcode indicates that item 100 has not been exposed to the tripping temperature. Then, once exposed to the tripping temperature, machine-readable message 902 may be obscured. At the same time, upon reaching the tripping temperature, temperature sensitive material of portion 904 becomes transparent, revealing a machine-readable message 906. Machine-readable message 906 may consist of a barcode representing a text message such as "Item XYZ Unsafe." While FIG. 9 illustrates a barcode, one skilled in the art will realize that machine-readable message 902 and machine-readable message 906 may be any type of machine-readable messages to indicate that temperature sensitive item 100 has been subjected to a temperature which may compromise item 100, such as glyphs.

Machine-readable message 902 and machine-readable message 906 may be detected and read by any type of device capable of reading the machine-readable message. For example, a barcode reader may scan label 102 to determine if machine-readable message 902 or machine-readable message 906 is visible.

In the example of label 102 described above with reference to FIG. 9, machine-readable message 902 and machine-readable message 906 may be part of label 102. Additionally, machine-readable message 902, machine-readable message 906, or both may be part of item 100. For example, machine-readable message 902 may be printed or may be preexistent on item 100. Then, label 102 may comprise a transparent temperature sensitive material in first portion 903. Label 102 may also comprise second portion 904, which includes machine-readable message 906 covered with an opaque temperature sensitive material. Label 102 may be positioned such that first portion 903 covers message 902. When the tripping temperature is reached, transparent temperature sensitive material of first portion 903 may become opaque or may darken, thereby obscuring machine-readable message 902. At the same time, the opaque temperature sensitive material of second portion 904 may become transparent revealing machine-readable message 906.

In the exemplary label 102 described in FIG. 9, the machine-readable messages may be covered with a transparent temperature sensitive material or an opaque temperature sensitive material. One skilled in the art will realize that the machine-readable messages may be constructed of the temperature sensitive material. As such, the machine-readable messages may change properties and become visible or invisible when exposed to the tripping temperature.

Figure 10:
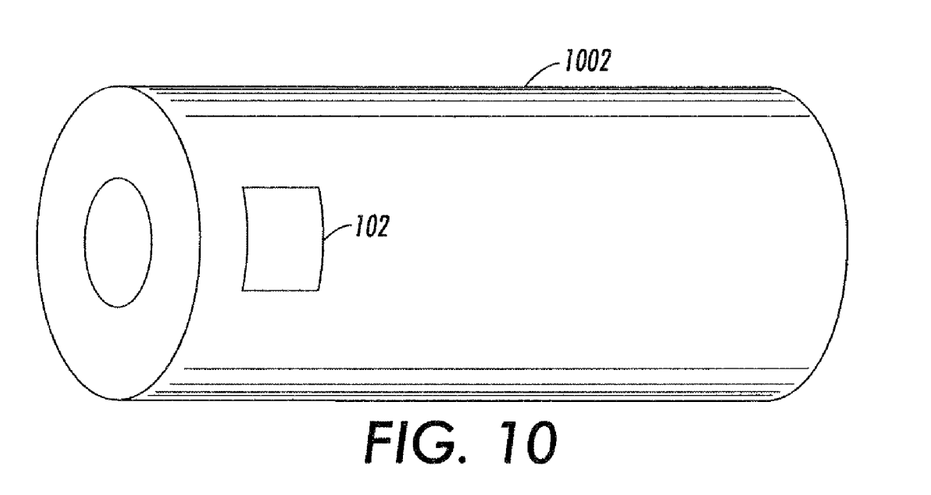
FIG. 10 is a diagram illustrating an exemplary toner container including a temperature sensitive label consistent with embodiments of the present disclosure.

As mentioned above, label 102 may be positioned on any type of item which may be susceptible to temperature changes. FIG. 10 is a diagram illustrating an exemplary label positioned on an exemplary item. As illustrated, label 102 may be positioned on a toner container 1002. Toner container 1002 may house toner for use in a printer or copier. Label 102 may be any of the exemplary labels 102 described above. Label 102 change properties at a tripping temperature that may fuse or block the toner.

Figure 11:
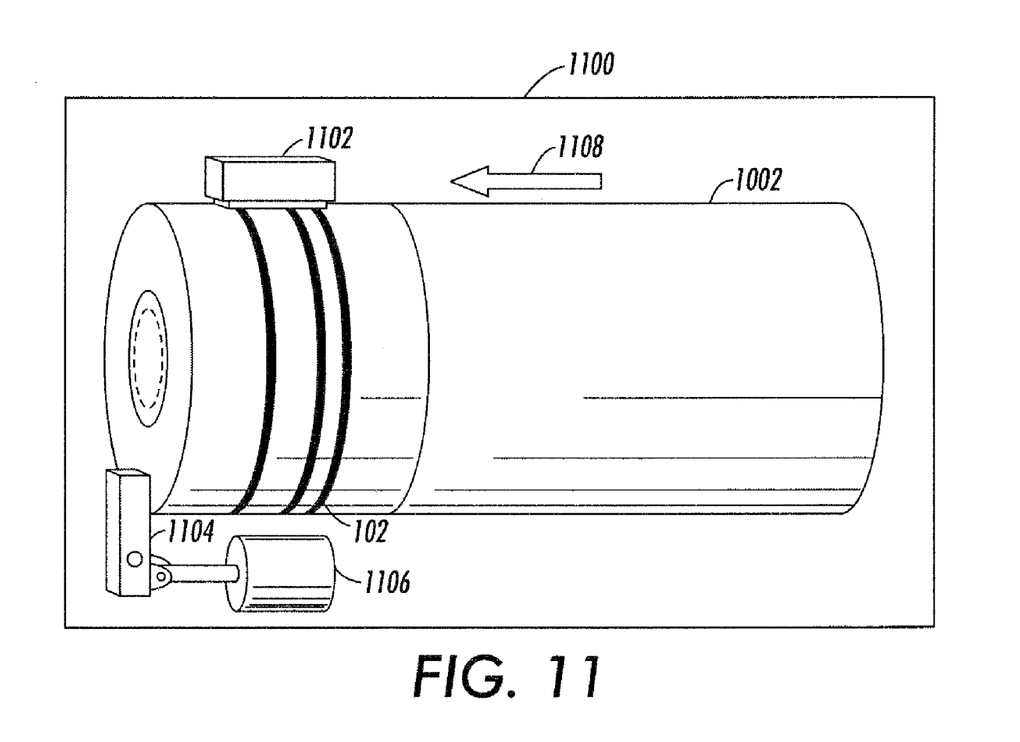
FIG. 11 is a diagram illustrating an exemplary system in which an exemplary toner container may be used.

For example, label 102 may include a barcode as illustrated in FIG. 6-9. As such, label 102 may be readable by a system including a barcode reader. FIG. 11 illustrates an exemplary system 1100 in which toner container 1002 may be utilized. System 1100 may be part of a copier or printer designed to utilize toner container 1002. System 1100 may prevent toner container 1002 from being utilized if toner container 1002 has been exposed to a tripping temperature. The tripping temperature may be the temperature at which the toner may fuse or block.

As illustrated, system 100 includes a barcode reader 1102, a movable barrier 1104, and a barrier control element 1106. During the operation of system 1100, toner container 1002 moves along an insertion path in an insertion direction 1108. Moveable barrier 1104 blocks further movement at an insertion checkpoint.

At the insertion checkpoint, barcode reader 1102 may scan label 102 to determine if toner container 1002 has been exposed to the tripping temperature. After scanning label 102, barcode reader 1102 may send a signal to barrier control element 1106. The signal may indicate the results of scanning label 102.

If label 102 conveys that toner container 1002 has been exposed to the tripping temperature, barrier control element 1106 may leave barrier 1104 blocking toner container 1002 path. As such, system 1100 may prevent damage to the printer or copier in which system 1100 resides. If label 102 conveys that toner container 1002 has not been exposed to the tripping temperature, barrier control element 1106 may move barrier 1104 from toner container 1002 path and allow toner container 1002 to proceed.

FIG. 11 illustrates a system 1100 in which toner container 1002 may be blocked from insertion to a printer or copier. One skilled in the art will realize that other methods may be utilized to prevent damage to the printer or copier. For example, system 1100 may disable the printer or copier if toner container 1002 has been exposed to the tripping temperature. Further, system 1100 may notify a user if toner container 1002 has been exposed to the tripping temperature.

Other embodiments of the present disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A toner container, comprising:
   a housing for storing toner;
   a message identifying whether the toner container has been exposed to a temperature, wherein the message comprises a first portion that conveys the toner container has not been exposed to the temperature, and a second portion that alters the first portion to convey that the toner container has been exposed to the temperature; and
   a label for identifying temperature change of the toner container, the label comprising:
      a material capable of changing properties when exposed to the temperature, wherein the material is positioned to function with the message to identify when the toner container has been exposed to the temperature,
      wherein the material comprises a first section that is transparent and becomes opaque when exposed to the temperature, and a second section that is opaque and becomes transparent when exposed to the temperature,
      wherein the first section of the material is positioned to cover the first portion of the message and block the first portion when exposed to the temperature, and
      wherein the second section of the material is positioned to cover the second portion of the message and reveal the second portion when exposed to the temperature.

2. The toner container of claim 1, wherein the message is at least one of human-readable and machine-readable.

3. The toner container of claim 1, wherein the message is a part of the label.

4. The toner container of claim 1, wherein the message is separate from the label.

5. A toner container, comprising:
   a housing for storing toner;
   a label for identifying temperature change of the toner container, the label comprising
      a first material that is transparent and becomes opaque when exposed to a temperature;
      a second material that is opaque and becomes transparent when exposed to the temperature,
      wherein the first material and the second material is are positioned to function with a first message that conveys the toner container has not been exposed to the temperature and a second message that conveys the toner container has been exposed to the temperature,
      wherein the first material is positioned to cover the first message and block the first message when exposed to the temperature, and
      wherein the second material is positioned to cover the second message and reveal the second message when exposed to the temperature.

6. The toner container of claim 5, wherein the first message and the second message are at least one of human-readable and machine-readable.

7. The toner container of claim 5, wherein the first message and the second message are a part of the label.

8. The toner container of claim 5, wherein the first message and the second message are separate from the label.

* * * * *